United States Patent
Mishra et al.

(10) Patent No.: US 10,800,129 B2
(45) Date of Patent: Oct. 13, 2020

(54) HONEYCOMB CORE SANDWICH PANELS

(71) Applicant: Bell Helicopter Textron Inc., Fort Worth, TX (US)

(72) Inventors: Suvankar Mishra, Carrollton, TX (US); Robert Mark Chris, Dallas, TX (US); Michael D. Ishmael, Bedford, TX (US); Ronald J. Turner, Fort Worth, TX (US)

(73) Assignee: Bell Textron Inc., Fort Worth, TX (US)

( * ) Notice: Subject to any disclaimer, the term of this patent is extended or adjusted under 35 U.S.C. 154(b) by 489 days.

(21) Appl. No.: 15/414,181

(22) Filed: Jan. 24, 2017

(65) Prior Publication Data

US 2018/0207899 A1    Jul. 26, 2018

(51) Int. Cl.
*B32B 3/12* (2006.01)
*B32B 37/06* (2006.01)
(Continued)

(52) U.S. Cl.
CPC ............... *B32B 3/12* (2013.01); *B32B 3/06* (2013.01); *B32B 3/20* (2013.01); *B32B 5/02* (2013.01); *B32B 7/02* (2013.01); *B32B 7/04* (2013.01); *B32B 7/08* (2013.01); *B32B 27/12* (2013.01); *B32B 27/16* (2013.01); *B32B 27/28* (2013.01); *B32B 27/281* (2013.01); *B32B 27/285* (2013.01); *B32B 27/38* (2013.01); *B32B 37/06* (2013.01); *B32B 41/00* (2013.01); *B32B 2250/40* (2013.01); *B32B 2260/023* (2013.01); *B32B 2260/046* (2013.01); *B32B 2307/54* (2013.01); *B32B 2307/544* (2013.01); *B32B 2307/546* (2013.01); *B32B 2307/552* (2013.01); *B32B 2307/558* (2013.01);
(Continued)

(58) Field of Classification Search
CPC .... B32B 3/06; B32B 3/12; B32B 3/20; B32B 5/02; B32B 7/02; B32B 7/04; B32B 7/08; B32B 37/06; B32B 37/146; B32B 41/00; B32B 2305/024
See application file for complete search history.

(56) References Cited

U.S. PATENT DOCUMENTS 4,249,976 A * 2/1981 Hudson ..................... B32B 3/12
                                                  156/286
4,315,050 A    2/1982 Rourke
(Continued)

OTHER PUBLICATIONS

European Patent Office; Communication pursuant to Article 94(3) EPC; Application No./Patent No. 17166889.0-1377; Reference JL88737P.EPP, dated Jul. 25, 2017.
(Continued)

*Primary Examiner* — George R Koch
(74) *Attorney, Agent, or Firm* — Baker Botts L.L.P.

(57) ABSTRACT

In accordance with one embodiment of the present disclosure, a method for manufacturing a honeycomb core sandwich panel includes placing a thermoset facesheet in contact with a thermoplastic honeycomb core without using a separate adhesive and attaching the thermoset facesheet to the thermoplastic honeycomb core by using a curing profile comprising a temperature that is lower than a gel point temperature of the thermoset facesheet and higher than a softening point temperature of the thermoplastic honeycomb core.

13 Claims, 5 Drawing Sheets

(51) Int. Cl.

| | | |
|---|---|---|
| *B32B 41/00* | (2006.01) | |
| *B32B 27/38* | (2006.01) | |
| *B32B 27/28* | (2006.01) | |
| *B32B 7/04* | (2019.01) | |
| *B32B 5/02* | (2006.01) | |
| *B32B 3/06* | (2006.01) | |
| *B32B 27/16* | (2006.01) | |
| *B32B 7/08* | (2019.01) | |
| *B32B 7/02* | (2019.01) | |
| *B32B 27/12* | (2006.01) | |
| *B32B 3/20* | (2006.01) | |

(52) U.S. Cl.
CPC ... *B32B 2307/712* (2013.01); *B32B 2307/732* (2013.01); *B32B 2309/02* (2013.01); *B32B 2309/68* (2013.01); *B32B 2439/00* (2013.01); *B32B 2439/62* (2013.01); *B32B 2603/00* (2013.01); *B32B 2605/00* (2013.01); *B32B 2605/12* (2013.01); *B32B 2605/18* (2013.01); *B32B 2607/00* (2013.01)

(56) References Cited

U.S. PATENT DOCUMENTS

| | | | |
|---|---|---|---|
| 4,353,947 | A | 10/1982 | Northcutt |
| 4,902,365 | A | 2/1990 | Westlake, Sr. |
| 4,954,382 | A | 9/1990 | Riefler et al. |
| 5,037,498 | A | 8/1991 | Umeda |
| 5,039,567 | A | 8/1991 | Landi et al. |
| 5,141,804 | A | 8/1992 | Riefler et al. |
| 5,192,482 | A | 3/1993 | Brambach |
| 5,316,604 | A | 5/1994 | Fell |
| 5,445,861 | A | 8/1995 | Newton et al. |
| 5,567,499 | A | 10/1996 | Cundiff et al. |
| 5,667,866 | A | 9/1997 | Reese, Jr. |
| 5,753,340 | A | 5/1998 | Welch et al. |
| 5,879,780 | A | 3/1999 | Kindinger et al. |
| 5,944,935 | A | 8/1999 | Zukas et al. |
| 6,099,680 | A | 8/2000 | Harris et al. |
| 6,117,518 | A | 9/2000 | Cawse et al. |
| 6,429,157 | B1 | 8/2002 | Kishi et al. |
| 6,440,257 | B1 | 8/2002 | Zhou et al. |
| 6,508,910 | B2 | 1/2003 | Zhou et al. |
| 6,776,865 | B1 | 8/2004 | Yamaguchi et al. |
| 7,208,223 | B2 | 4/2007 | Ross |
| 7,258,760 | B2 | 8/2007 | Yamaguchi et al. |
| 7,294,220 | B2 | 11/2007 | Anderson |
| 7,306,761 | B2 | 12/2007 | Bannister et al. |
| 7,507,461 | B2 | 3/2009 | Wang et al. |
| 7,550,190 | B2 | 6/2009 | Wang et al. |
| 7,581,366 | B2 | 9/2009 | Smith et al. |
| 7,771,809 | B2 | 8/2010 | Hendren et al. |
| 7,785,520 | B2 | 8/2010 | Khan et al. |
| 7,866,535 | B2 | 1/2011 | Eilert et al. |
| 7,923,102 | B2 | 4/2011 | Tilbrook et al. |
| 7,938,922 | B2 | 5/2011 | Wang et al. |
| 7,988,809 | B2 | 8/2011 | Smith et al. |
| 8,070,994 | B2 | 12/2011 | Carlson et al. |
| 8,128,028 | B2 | 3/2012 | Grillos |
| 8,206,808 | B2 | 6/2012 | Khan et al. |
| 8,367,183 | B2 | 2/2013 | Take et al. |
| 8,450,225 | B2 | 5/2013 | Restuccia et al. |
| 8,668,983 | B2 | 3/2014 | Kawazoe et al. |
| 8,707,747 | B1 | 4/2014 | Norris |
| 8,790,486 | B2 | 7/2014 | Hou et al. |
| 8,932,422 | B2 | 1/2015 | de Groot |
| 9,074,091 | B2 | 7/2015 | Kawazoe et al. |
| 9,091,066 | B2 | 7/2015 | Brewster et al. |
| 9,091,067 | B2 | 7/2015 | Brewster et al. |
| 9,242,425 | B2 | 1/2016 | de Groot |
| 9,314,992 | B2 | 4/2016 | Mortimer et al. |
| 2001/0042593 | A1 | 11/2001 | Zhou et al. |
| 2006/0151108 | A1 | 7/2006 | St. Denis et al. |
| 2007/0095459 | A1 | 5/2007 | Smith et al. |
| 2009/0297763 | A1* | 12/2009 | Ross ............... B32B 5/02 428/116 |
| 2010/0108259 | A1 | 5/2010 | Aspin |
| 2011/0281114 | A1 | 11/2011 | Butler |
| 2012/0048451 | A1 | 3/2012 | Carlson et al. |
| 2012/0048487 | A1 | 3/2012 | Brewster et al. |
| 2012/0282434 | A1* | 11/2012 | Cawse ............ C08G 59/3227 428/116 |
| 2012/0321835 | A1 | 12/2012 | Hethcock, Jr. et al. |
| 2013/0122245 | A1 | 5/2013 | Williams |
| 2013/0196175 | A1* | 8/2013 | Levit ............... B32B 38/00 428/688 |
| 2015/0151524 | A1 | 6/2015 | Matsura et al. |
| 2015/0239200 | A1 | 8/2015 | Bartolome |
| 2016/0167333 | A1 | 6/2016 | Hethcock, Jr. et al. |

OTHER PUBLICATIONS

European Patent Office; European Search Report; Application No./Patent No. 17166889.0-1377; Reference JL88737P.EPP, dated Jul. 6, 2017.

Tubus Bauer, Im Verbund—start, Datasheet Tubus Core, Sep. 2, 2015.

European Patent Office; Communication pursuant to Article 94(3) EPC; Application No./Patent No. 17166889.0-1377; Reference JL88737P.EPP, dated Dec. 8, 2017.

* cited by examiner

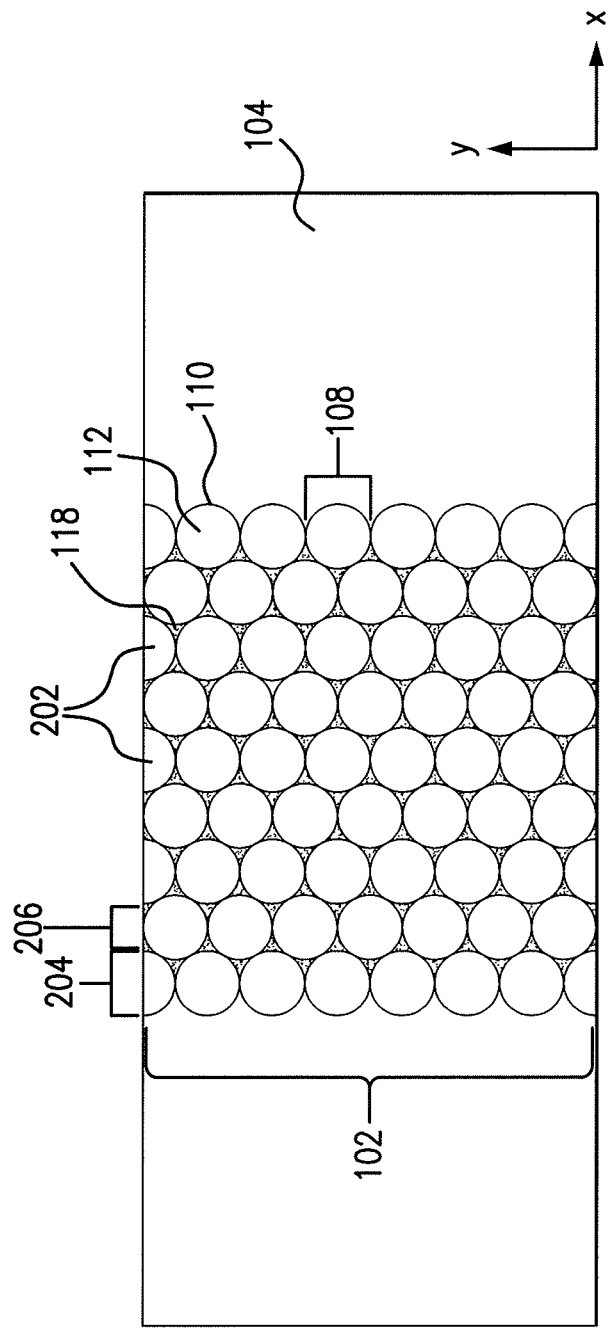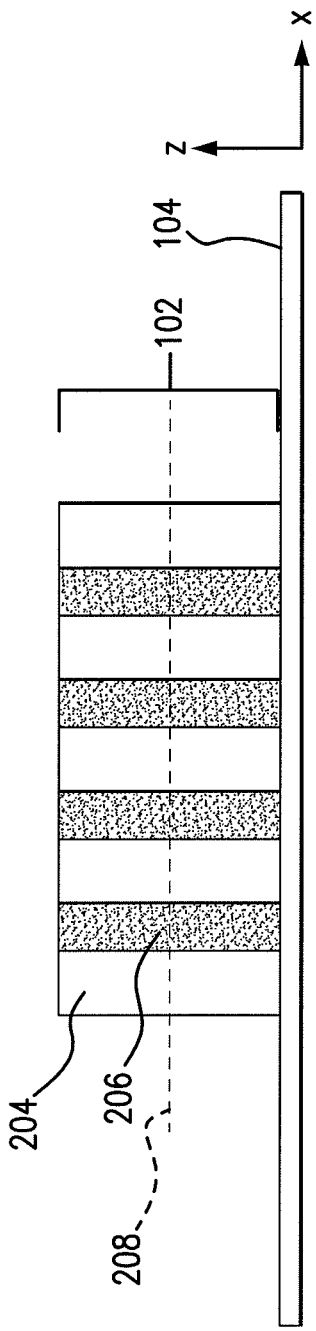
FIG. 2A
FIG. 2B

HONEYCOMB CORE SANDWICH PANELS

TECHNICAL FIELD

The present disclosure relates generally to sandwich panel assemblies, and more specifically to honeycomb core sandwich panel assemblies.

BACKGROUND

Honeycomb core sandwich panels are used in structures, such as aircraft, to maintain strength and stiffness while minimizing the structure's weight. Honeycomb core sandwich panels generally comprise facesheets and a honeycomb core, which typically are made of materials such as Nomex®, Kevlar®, fiberglass or aluminum. While incorporating honeycomb cores can help make sandwich panels lighter than, e.g., using certain solid cores, the weight of typical honeycomb core sandwich panels still presents challenges in certain applications.

SUMMARY OF THE DISCLOSURE

In accordance with one embodiment of the present disclosure, a method for manufacturing a honeycomb core sandwich panel includes placing a thermoset facesheet in contact with a thermoplastic honeycomb core without using a separate adhesive and attaching the thermoset facesheet to the thermoplastic honeycomb core by using a curing profile comprising a temperature that is lower than a gel point temperature of the thermoset facesheet and higher than a softening point temperature of the thermoplastic honeycomb core.

In accordance with another embodiment of the present disclosure, a honeycomb core sandwich panel includes a thermoset facesheet and a thermoplastic honeycomb core. The thermoplastic honeycomb core in this embodiment contains a plurality of cells, each cell comprising a curved cell wall in a substantially circular tube shape, wherein measured at a midplane of each cell, the diameter of the substantially circular tube does not vary more than about 10 percent within the same cell. The thermoset facesheet is attached to the thermoplastic core by chemical bonds between the thermoset facesheet and the thermoplastic core or mechanical interlocking between the thermoset facesheet and the thermoplastic core.

In accordance with the present disclosure, certain embodiments may provide one or more technical advantages and may address, mitigate, or eliminate challenges associated with honeycomb core sandwich panels (HSPs). Certain example challenges include moisture ingress into the honeycomb core. As another example challenge, some HSPs use materials that have significant directionally-dependent material (anisotropic) properties, where, e.g., the honeycomb and/or the finished HSP must be oriented in a certain direction during fabrication or installation to avoid structural weaknesses in the HSP. In addition, HSPs can have a high cost of manufacture due to, e.g., numerous and/or costly manufacturing steps, manufacturing equipment and materials. Certain embodiments of the present disclosure mitigate and address some or all of these challenges, as well as provide other benefits. For example, using a combination of uncured epoxy composite prepregs (facesheets) co-cured to a thermoplastic (e.g., polyetherimide) honeycomb core in particular embodiments may produce moisture resistant, near-isotropic, and/or lower-cost sandwich panels.

With some embodiments, there is virtually no moisture ingress into the honeycomb core because a reliable bond can be achieved between an epoxy prepreg facesheet and a thermoplastic core. This reliable bond can be achieved in certain embodiments without the use of an adhesive (e.g., epoxy or thermoplastic film adhesives) between the epoxy composite prepreg facesheet and the honeycomb core. Removing the need for adhesives also reduces the weight—a significant advantage when used in, e.g., aircraft applications—and cost of HSPs.

In addition, in some embodiments cost savings are achieved by reducing raw material and/or processing costs. For example, when paired with a suitable out of autoclave prepreg system, HSPs may be processed in a vacuum-capable oven in certain embodiments, and/or in one curing step, which simplifies the manufacturing process and reduces production costs.

Moreover, the thermoplastic honeycomb core in some embodiments acts as an isotropic (or near-isotropic) material properties in the X and Y directions (e.g., along the plane of the HSP), alleviating the need to precisely orient, monitor, and verify the direction of the honeycomb core during design, fabrication, and installation. Another benefit of the sandwich panel in certain embodiments is the thermoplastic core material's ability to conform to radii (e.g., when bent or formed) which would otherwise force a splice in traditional honeycomb core materials.

Particular embodiments of this disclosure may be used, e.g., in some or any Class I and II airframe and rotor blade structures.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which:

FIG. 2A illustrates a top-down view (the X-Y plane) of the example HSP from FIG. 1 that has been cut and has the upper facesheet removed, according to an example embodiment.

FIG. 2B illustrates a side view (the X-Z plane) of the example HSP from FIG. 1 that has been cut and has the upper facesheet from FIG. 1 removed, according to an example embodiment.

DETAILED DESCRIPTION OF THE DRAWINGS

Figure 1:
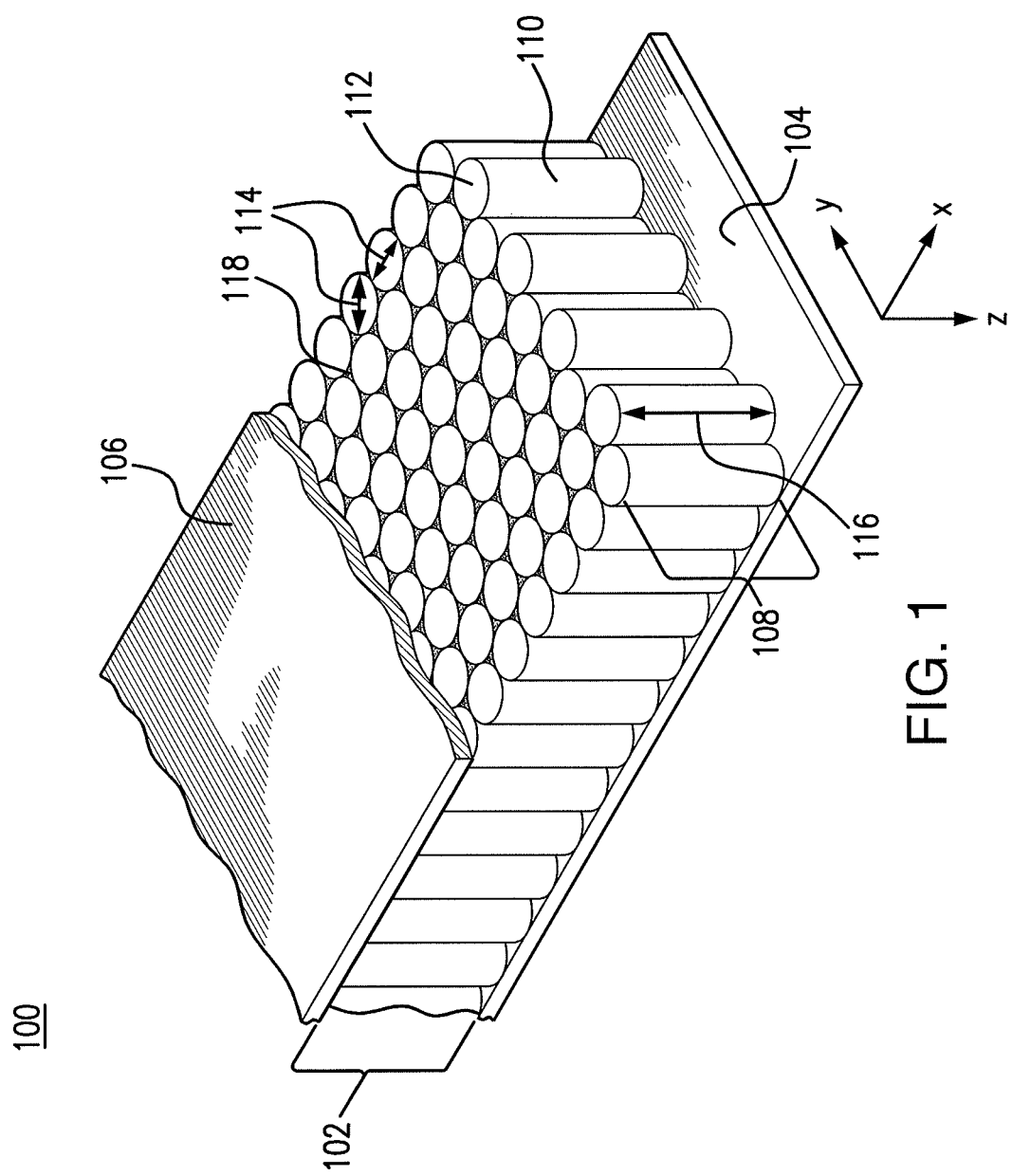
FIG. 1 illustrates an example honeycomb core sandwich panel (HSP), according to an example embodiment.

Honeycomb core sandwich panels are used in structures such as aircraft, industrial, and marine structures to maintain strength and stiffness while minimizing the structure's weight. Honeycomb core sandwich panels generally comprise facesheets and a honeycomb core.

Honeycomb core sandwich panel assemblies may benefit from a simpler manufacturing process that more reliably bonds (attached or joins) thermoset facesheets with honeycomb cores, and more particularly from a simpler process that more reliably bonds (attaches or joins) epoxy resin prepreg facesheets with thermoplastic honeycomb cores. Specifically, by co-curing thermoset facesheets and a thermoplastic core together, the manufacturing process for honeycomb core sandwich panels may be simplified and completed at a lower cost. In some embodiments, such co-curing may result in a strong and reliable attachment between the honeycomb core and the facesheets in a single curing step—multiple curing steps may not be needed. Furthermore, reliable co-curing of epoxy facesheets and thermoplastic cores can be accomplished without using adhesives, such as a film adhesive (e.g. epoxy or thermoplastic), which may decrease the weight and cost of honeycomb core sandwich panel assemblies. Lighter sandwich panels used in aircraft, for example, may reduce fuel consumption, increase cargo and personnel capacity, or both. Moreover, by creating a reliable attachment (bond) between thermoset facesheets and thermoplastic cores, moisture ingress into the voids of the honeycomb cores may be reduced or effectively eliminated without requiring sealing of the edges of the honeycomb core sandwich panels (e.g., with edge potting) or closeouts (e.g., made of fiberglass). Embodiments of the present disclosure may also allow for honeycomb core sandwich panels to be processed in a vacuum-capable oven, for example, when a suitable out-of-autoclave prepreg is used as a thermoset facesheet covering a honeycomb core.

Another advantage of co-curing thermoset facesheets and a thermoplastic core together is that, based on the material and shape of the honeycomb core (e.g., a honeycomb core comprising many thermoplastic circular tubes), the finished honeycomb core sandwich panel may exhibit isotropic or near-isotropic material properties (e.g., in the X and Y directions along the plane of the honeycomb core), instead of significant anisotropic material properties. This may be important, as honeycomb core sandwich panels may encounter isotropic or near-isotropic forces during use. The more isotropic the material properties of the honeycomb core, the less need there is to define the orientation of the honeycomb core during fabrication and installation, which may save costs and time during manufacturing and installation. In addition, the use of a thermoplastic honeycomb core may increase the core's (and, hence, the panel's) ability to bend and conform to radii that may force a splice in traditional honeycomb core materials (e.g., aluminum, fiberglass, etc.). Various embodiments of this disclosure may provide some, all, or none of these functions or benefits, or any other functions or benefits readily apparent from this disclosure.

To facilitate a better understanding of the present disclosure, the following provides examples of certain embodiments. The following examples are not to be read to limit or define the scope of the disclosure. Embodiments of the present disclosure and its advantages may be understood by referring to FIGS. 1 through 5, where like numbers are used to indicate like and corresponding parts.

FIG. 1 illustrates an example honeycomb core sandwich panel (HSP) 100, according to an example embodiment. Specifically, FIG. 1 illustrates an HSP 100 having a honeycomb core 102, a lower facesheet 104, and an upper facesheet 106. HSP 100 may be used, e.g., for structural applications such as airframe panels, rotor blade assemblies, windmill blades, boxes and containers, structural elements in boats (e.g., hulls, bulkheads), or any other application where a low-weight, high-strength structural material may be useful.

In general, honeycomb core 102 is the core of HSP 100 and connects to lower facesheet 104 and upper facesheet 106 (existing in between facesheets 104 and 106) to create HSP 100. In certain embodiments, honeycomb core 102 provides structural stability and strength while reducing the weight of HSP 100, compared to a similar sandwich panel having, e.g., a solid core. Honeycomb core 102 comprises a number of cells 108. In some embodiments, each cell 108 may comprise cell wall(s) 110 of a particular shape and arranged in a particular configuration, and one or more voids 112. Cell walls 110 may comprise, for example, a thermoplastic such as PEI (polyetherimide) and/or any other suitable thermoplastic. In certain embodiments, cell walls 110 may comprise other non-thermoplastic materials as well (either in combination with a thermoplastic or not). Void 112 may comprise air, compressed air, nitrogen, any suitable gas at any suitable pressure (e.g., ambient pressure during manufacturing, pressure at sea level, approximately 1 atm, pressure at a service altitude, etc.), or any other suitable non-gas material (or lack thereof). In particular embodiments, the contents of void 112 are less dense than the material comprising cell walls 110 (e.g., PEI).

Cells 108 may comprise cell wall 110 forming a tube-like structure having a particular shape in some embodiments of honeycomb core 102. Moreover, some or all of cells 108 may have the same shape in HSP 100. For example, cell wall 110 may be a polygon-shaped (e.g., a hexagon, an octagon, etc.) tube. In certain embodiments, cell wall 110 may be curved and may form a circular or substantially circular tube shape (e.g., a cylinder with a void 112) or an elliptical or substantially elliptical tube shape. As an example, cell wall 110 may be a circular tube, where a measuring line 114 passes from one point on an inner edge of cell wall 110 (the inner edge of cell wall 110 where void 112 ends), through the center of cell 108, to another point on an opposite inner edge of cell wall 110. In this example embodiment, the length of measuring line 114 may not vary more than 1%, 2%, 5%, 10%, 20%, or 25% (or any other suitable percentage) between any two such points on an inner edge of cell wall 110 within any one given cell 108 in honeycomb core 102. Similarly, the length of measuring line 114 in a first cell 108 in honeycomb core 102 may not vary more than 1%, 2%, 5%, 10%, 20%, 25%, 50% (or any other suitable percentage) from measuring line 114 in a second cell 108 in honeycomb core 102. A first cell 108 may, in some embodiments, be the same shape but a different size than a second cell 102 in the same honeycomb core 102.

Each cell 108 of honeycomb core 102, in particular embodiments, comprises a curved cell wall 110 in a substantially circular tube shape, wherein at a midplane 208 (described in FIG. 2B) of each cell 108, the diameter of the substantially circular tube may not vary more than 1%, 2%, 5%, 10%, 20%, 25%, 50% (or any other suitable percentage) within the same cell 108. Similarly, the diameter of each substantially circular tube measured at midplane 208 may not, in certain embodiments, vary more than 1%, 2%, 5%, 10%, 20%, 25%, 50% (or any other suitable percentage) from any other substantially circular tube measured at midplane 208.

Cells 108 may be oriented and arranged in particular ways in some embodiments. For example, honeycomb core 102 may comprise cells 108 having a tube-like shape with a longitudinal axis 116 (e.g., parallel to the Z axis in FIG. 1) that is perpendicular, or substantially perpendicular to the planes of lower facesheet 104 and/or upper facesheet 106, which may, in certain embodiments, be parallel to one another. Furthermore, in some embodiments, cells 108 may be arranged in particular patterns. For example, in the example of FIG. 1, cells 108 are arranged such that each cell 108 is a circular tube that is adjacent to six cells 108 that are also circular tubes (except for the edges of HSP 100, where honeycomb core 102 may be cut in any suitable orientation, causing any number of partial cells 108). Space 118 between cells 108 may comprise the same or different material as cell walls 110. For example, space 118 may comprise PEI and cell walls 110 may comprise PEI, such that various cell walls 110 merge together with each other and with spaces 118 in some or all locations. In particular embodiments, the shape of cells 108 and/or the arrangement of cells 108 in honeycomb core 102 may minimize anisotropic properties of HSP 100 in the X and Y dimensions of FIG. 1 (e.g., the plane of lower facesheet 104 and upper facesheet 106). Conversely, in certain embodiments, the shape of cells 108 and/or the arrangement of cells 108 in honeycomb core 102 may maximize isotropic properties of HSP 100 in the X and Y dimensions (e.g., the plane of lower facesheet 104 and upper facesheet 106), such that honeycomb core 102 and/or HSP 100 can be oriented in any direction in the X and Y plane, such that a compression force along the X axis required to cause a circular one-foot diameter portion (or other-shaped and other-sized portion) of HSP 100 to fail will vary by no more than 1%, 2%, 5%, 10%, 20%, or 25% (or any other suitable percentage) at different orientations of HSP 100 in the X and Y plane.

In general, lower facesheet 104 and upper facesheet 106 sandwich honeycomb core 102 between themselves. Facesheets 104 and 106, in certain embodiments, provide an outer surface of HSP 100, bond to honeycomb core 102 (e.g., chemically and/or mechanically) to provide stability to HSP 100, and/or seal openings in honeycomb 102. Facesheets 104 and 106, in some embodiments, are thermoset facesheets. For example, in particular embodiments facesheets 104 and 106 comprise epoxy resin or epoxy resin pre-impregnated with fibers and/or other materials ("prepregs"). Additional information regarding facesheets 104 and 106 is discussed in connection with FIG. 3. In some embodiments of the present disclosure, honeycomb core 102 comprises one or more thermoplastics (such as PEI) and facesheets 104 and 106 comprise one or more epoxy resins (including epoxy resin prepregs such as a Cycom® 5320-1 epoxy resin prepreg made by Cytec Industries® or any other suitable epoxy or epoxy resin prepreg).

Honeycomb core 102 and facesheets 104 and 106 may be joined in such a way as to prevent moisture ingress into some, most, or all voids 112 of honeycomb 102. For example, by using the example method 400 in FIG. 4, certain embodiments may comprise an HSP 100 having a thermoplastic honeycomb core 102 and epoxy resin prepreg facesheets 104 and 106 joined together chemically and/or mechanically such that moisture does not ingress into more than 1% to 50% (or any other suitable percentage) of voids 112 in honeycomb core 102 of HSP 100 after HSP 100 is submerged in 1 foot of water for 10 minutes. As another example, HSP 100 is placed in a humidity chamber set at a temperature (e.g., 160° F.) and a relative humidity (e.g., 95% relative humidity). In such an example, the weight gain of HSP 100 may be measured every week, and a saturation level may be obtained when three consecutive readings have the same weight gain. Other suitable measuring intervals saturation requirements are contemplated. In certain embodiments, HSP 100 may have a saturation level weight gain of 1% or less (percentage weight gain based on the initial weight of HSP 100 before moisture ingress testing), or any other suitable saturation level weight gain, for example, 1% to 50%, etc. In particular embodiments, no separate adhesive (e.g., a film adhesive or other adhesive) is used to join (or exists between) honeycomb core 102 and lower facesheet 104 and/or upper facesheet 106.

FIGS. 2A and 2B illustrate different views of cut portions of the example HSP 100 from FIG. 1. Specifically, FIG. 2A illustrates a top-down view (the X-Y plane) of the example HSP 100 from FIG. 1 that has been cut and has the upper facesheet 106 removed, according to an example embodiment. The example shown in FIG. 2A comprises lower facesheet 104 and honeycomb core 102, including cells 108 having cell walls 110, voids 112, and spaces 118, each of which are the same as described in FIG. 1. The HSP example shown in FIG. 2 has been cut on the sides, which has cut some cells 202 such that cut cells 202 do not have complete cell walls 110. In certain embodiments, cutting HSP 100 causes areas 204 and 206, where area 204 describes a portion of a cut cell and area 206 describes a portion of cell wall 110. When HSP 100 is cut in some embodiment, area 204 may describe a layer of honeycomb core material deposited along the cut line (thus sealing off cut cells 202), or area 204 may describe the inner wall of cut cells 202 (e.g., the inside of a tube-shaped cell wall 110). In particular embodiments, HSP 100 can be cut in a straight line in any direction along the X-Y plane such that a compression force along the X axis required to cause HSP 100 to fail will vary by no more than 1%, 2%, 5%, 10%, 20%, or 25% (or any other suitable percentage).

FIG. 2B illustrates a side view (the X-Z plane) of the example HSP 100 from FIG. 1 that has been cut and has the upper facesheet from FIG. 1 removed, according to an example embodiment. Specifically, FIG. 2B illustrates a side view version of FIG. 2A. Honeycomb core 102 is shown attached to lower facesheet 104, and areas 204 and 206 are shown from the side (e.g., the X-Z plane). In addition, midplane 208 generally represents a plane near the center of cells 108 where, e.g., diameter measurements of cells 108 may be taken in certain embodiments. For example, midplane 208 may bisect one or more cells 108, measured from each end of such cells 108. As another example, midplane 208 may pass through anywhere in the middle 25 percent one or more cells 108, measured from each end of such cells 108. As shown in the example of FIG. 2B, midplane 208 lies midway between the top and bottom of cells 208. In certain embodiments, the diameter of certain cells may be measured at midplane 208, as described above concerning FIG. 1.

Figure 3:
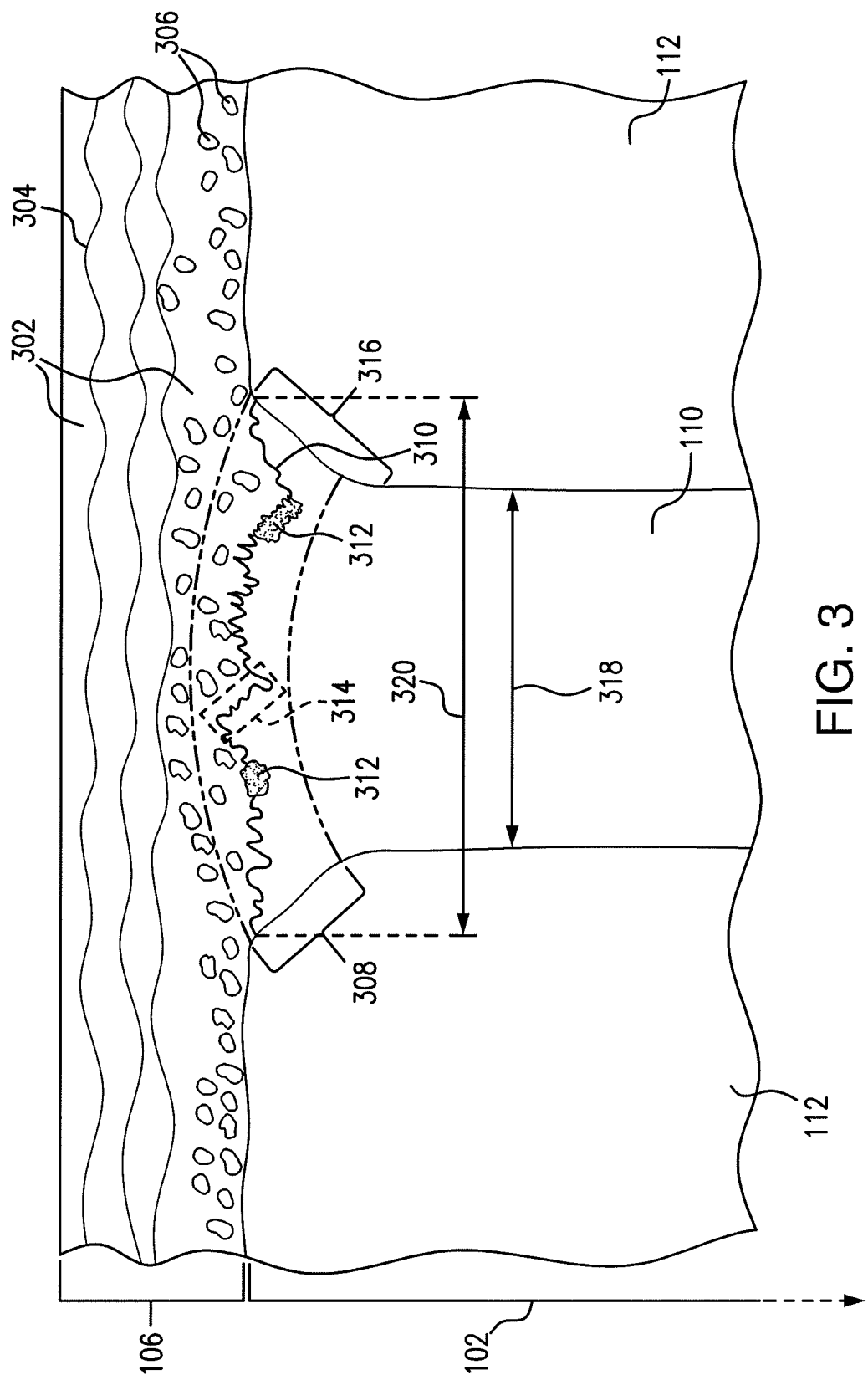
FIG. 3 illustrates a close up view of an interface of a cell wall of the honeycomb core of FIG. 1 and the upper facesheet of FIG. 1, according to an example embodiment.

FIG. 3 illustrates a close up view of an interface of a cell wall 110 of the honeycomb core 102 of FIG. 1 and the upper facesheet 106 of FIG. 1, according to an example embodiment. In general, FIG. 3 illustrates how the honeycomb core 102 of FIG. 1 joins (or attaches) to facesheets such as upper and lower facesheets 104 and 106 according to certain embodiments of the present disclosure. More particularly, FIG. 3 illustrates how in certain embodiments, when following the example method 400 of FIG. 4, a honeycomb core comprising thermoplastic can join or attach to a facesheet comprising epoxy resin, without necessitating the addition of an adhesive layer. In the example shown in FIG. 3, upper facesheet 106 is illustrated as an epoxy resin prepreg including epoxy resin 302, fibers 304, and a toughening agent 306. Moreover, FIG. 3 also illustrates an interface region 308 where honeycomb core 102 and facesheet 106 attach to each other, which includes an interface line 310 having chemical interaction regions 312 and mechanical interlocking regions 314.

Epoxy resin 302 may be impregnated with fibers 304, which may provide, e.g., flexibility, reinforcement, and/or strength to a prepreg (e.g., upper facesheet 106). In particular embodiments, epoxy resin 302 may be any suitable epoxy resin, and particularly may be any suitable epoxy resin that can securely attach to a thermoplastic honeycomb core without the need of a separate adhesive, when prepared according to certain embodiments of the present disclosure (e.g., according to method 400 in FIG. 4). Fibers 304, in particular embodiments, may be any suitable fiber for a prepreg, including, e.g., carbon fiber filaments, fiberglass, etc.

Furthermore, facesheet 106 (shown as a prepreg in FIG. 3) may also comprise one or more toughening agents 306. In general, toughening agent 306 may provide flexibility, resiliency, a modified curing profile, certain rheological properties, and/or stiffness, etc. to a prepreg. In particular embodiments, toughening agent 306 may be a thermoplastic material or any other suitable toughening agent.

Interface region 308 describes the general area where honeycomb 102 and facesheet 106 interface and attach (or join) to one another. The same interface region 308 may occur at the interface of honeycomb core 102 and any other facesheet, such as lower facesheet 104, in certain embodiments. In particular embodiments, method 400 of FIG. 4 may produce some or all of the elements described in interface region 308 when a thermoplastic honeycomb core is attached to a thermoset (e.g., epoxy resin) facesheet according to certain embodiments of this disclosure.

Interface line 310 describes the rough line or area separating honeycomb core 102 from facesheet 106. Along interface line 310, chemical interaction regions 312 illustrate areas where portions of honeycomb core 102 have chemically interacted with portions of facesheet 106. For example, in certain embodiments, chemical interaction regions 312 represent chemical bonding and/or mixing of thermoplastic in an example honeycomb core 102 with epoxy resin in an example facesheet 106. Chemical interactions between honeycomb core 102 and facesheet 106 may join or attach honeycomb core 102 and facesheet 106 together and/or may assist with preventing moisture ingress into voids 112 of honeycomb core 102.

Similarly, along interface line 310, mechanical interlocking regions 314 illustrate areas where portions of honeycomb core 102 have mechanically interlocked with portions of facesheet 106. For example, in certain embodiments, mechanical interlocking regions 314 represent mechanical interlocking of thermoplastic in an example honeycomb core 102 with epoxy resin in an example facesheet 106. Mechanical interactions between honeycomb core 102 and facesheet 106 may join or attach honeycomb core 102 and facesheet 106 together and/or may assist with preventing moisture ingress into voids 112 of honeycomb core 102. Softening of honeycomb core 102 (e.g., when made of a thermoplastic material) while curing a thermoset facesheet in certain embodiments may help create mechanical interlocking regions 314 during manufacture of HSP 100.

Figure 4:
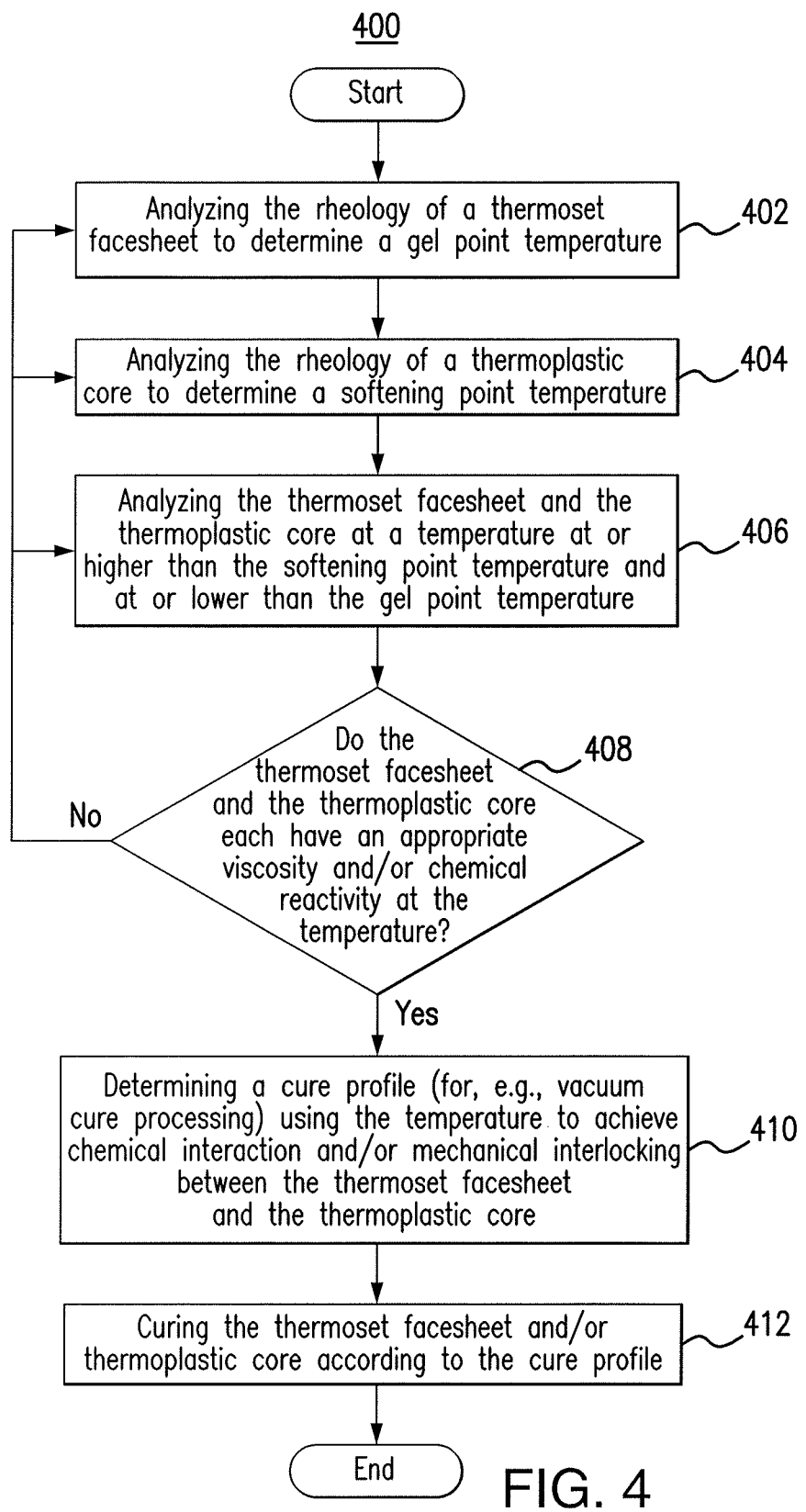
FIG. 4 illustrates an example method of producing HSPs, for example, the HSP and portions thereof described in FIGS. 1, 2A, 2B, and 3, according to an example embodiment.

The example embodiment shown in FIG. 3 also shows deformation zone 316, which in general represents portions of honeycomb core 102 deforming near interface line 310 when heated during processing of HSP 100, for example, as described in method 400 of FIG. 4. For example, deformation zone 316 may bulge out when thermoplastic in honeycomb core 102 is softened by heat during manufacture and pressed or lightly crushed against facesheet 106. When cooled, such a bulge in deformation zone 316 may remain. In certain embodiments, cell wall thickness 318 outside of deformation zone 316 (i.e., closer to the center of honeycomb 102 and further away from interface line 310) may be smaller (or shorter) than cell wall thickness 320 inside deformation zone 316. In certain embodiments, having a cell wall thickness 318 outside of deformation zone 316 being smaller than cell wall thickness 320 inside of deformation zone 316 may be an indication of a more successful joining of a honeycomb core 102 comprising thermoplastic with facesheet 106.

FIG. 4 illustrates an example method 400 of producing HSPs, for example, the HSP 100 and portions thereof described in FIGS. 1, 2A, 2B, and 3, according to an example embodiment. Method 400 begins at step 402 and ends after step 412.

Figure 5:
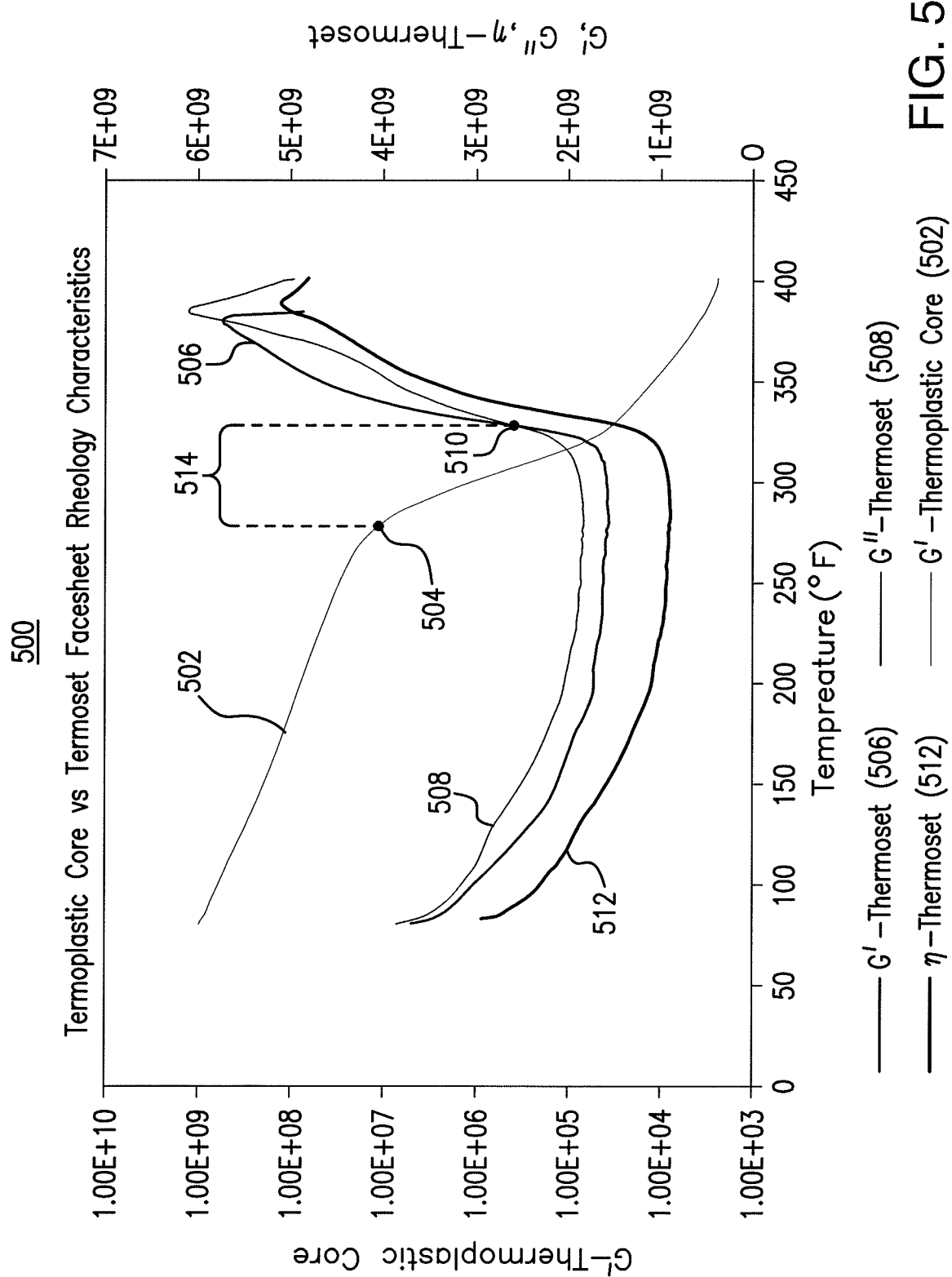
FIG. 5 illustrates an example analysis of rheology characteristics of an example thermoplastic core and an example thermoset facesheet, according to an example embodiment.

Step 402 comprises analyzing the rheology of a thermoset facesheet to determine a gel point temperature. For example, step 402 may comprise analyzing a facesheet (such as a thermoset epoxy resin facesheet/prepreg as described in FIGS. 1-3) to determine a gel point temperature. A gel point temperature is generally a temperature around which point the viscosity of a thermoset material in a facesheet (e.g., a particular epoxy) begins to rise with temperature and the thermoset material begins to solidify. FIG. 5 provides an example of the analysis described in step 402. In certain embodiments, temperatures below the gel point temperature are temperatures at which a thermoset material in a facesheet (e.g., a particular epoxy in a facesheet such as facesheets 104 and 106) flows (has a lower viscosity) and/or chemically interacts with other compounds. A gel point temperature, in some embodiments, may be 100° F.-500° F., 200° F.-400° F., 250° F.-375° F., 300° F.-350° F., or any other suitable temperature or temperature range.

Step 404 comprises analyzing the rheology of a thermoplastic core (e.g., one or more thermoplastic materials comprising the thermoplastic core) to determine a softening point temperature. For example, step 404 may comprise analyzing a thermoplastic honeycomb core, such as honeycomb core 102 as described in FIGS. 1-3, to determine a softening point temperature. A softening point temperature is generally a temperature where the viscosity of a thermoplastic material (e.g., in a honeycomb core) begins to drop with temperature and begins to flow. FIG. 5 provides an example of the analysis described in step 404. In certain embodiments, temperatures at or above the softening point temperature are temperatures at which a thermoplastic material in a honeycomb core (e.g., PEI in an example honeycomb core 102) begins to flow or soften (has a lower viscosity) and/or chemically interact with other compounds, such as a thermoset material. At certain temperatures above the softening point in some embodiments, the viscosity of the thermoplastic material may rise and may begin to stop flowing, thus creating one or more ranges of temperatures where the thermoplastic material softens, has a lower viscosity, and/or begins to flows or softens and/or chemically interacts with other compounds. At certain temperatures above the softening point in some embodiments, the viscosity of the thermoplastic material may become too soft or flow too much, causing, for example, significant structural degradation of the honeycomb core (e.g., a significant loss of the honeycomb shape, structural strength, etc.). A softening point temperature, in some embodiments, may be 100° F.-500° F., 150° F.-400° F., 200° F.-350° F., 250° F.-300° F., or any other suitable temperature or temperature range.

Step 406 comprises analyzing the thermoset facesheet and the thermoplastic core at a temperature that is at or higher than the softening point temperature and at or lower than the gel point temperature. In certain embodiments, step 406 comprises determining one or more characteristics (e.g., rheology or viscosity/softness/ability to deform or flow, chemical activity) of the thermoplastic core and/or the thermoset facesheet at the temperature determined in step 406. FIG. 5 provides an example of the analysis described in steps 402-406.

Step 408 comprises determining whether the thermoset facesheet and the thermoplastic core each have an appropriate viscosity and/or chemical reactivity at the temperature determined in step 406. In certain embodiments, the one or more characteristics (e.g., rheology or viscosity/softness/ability to deform or flow, chemical activity) of the thermoplastic core and/or the thermoset facesheet are reviewed to determine if, at the determined temperature, the thermoplastic core and/or the thermoset facesheet are softened to allow, e.g., mechanical interlocking between the two materials and/or chemical reactions between the two materials. With regard to the thermoplastic core, for example, it may be analyzed in example embodiments to determine if, at the temperature determined in step 406, the thermoplastic material in the core (e.g., honeycomb core 102) flows or softens (e.g., melts slightly) and/or chemically interacts with other compounds, such as a thermoset material (e.g., an epoxy resin analyzed at step 402). For many embodiments, the goal of finding the temperature determined in step 406 is so that, during manufacture, the now soft (e.g., slightly melted) edges of cell walls 110 can be crushed or deformed to a degree, thus enabling a larger surface area of the thermoplastic core to contact the facesheet. This softening of the thermoplastic core in many embodiments will not describe a free-flowing thermoplastic core or a thermoplastic core that has lost significant structural integrity (e.g., cell walls 110 of the thermoplastic core in many embodiments will not buckle when pressed against the facesheet). For example, a suitable temperature in many embodiments will not cause the thermoplastic core to freely deform or flow such that, e.g., any honeycomb or tube shapes are lost or significantly deformed. Generally, in certain embodiments, at the temperature determined in step 406, the thermoplastic core will deform such that when it is pressed against a thermoset facesheet it creates, for example, deformation zones such as deformation zones 316 of FIG. 3.

If at the temperature determined at step 406 the thermoplastic core and/or the thermoset facesheet is not appropriately soft/viscous (e.g., is not soft enough or is too soft), then method 400 returns to step 406, or possibly step 402 or 404 if the analyzed materials have multiple softening point temperatures or gel point temperatures. If method 400 returns to step 406, then a new temperature is determined. If method 400 returns to step 402 or 404, then a different thermoset facesheet or thermoplastic core, respectively, is analyzed and/or a different gel point temperature or softening point temperature, respectively, is determined. Steps 402-408 may repeat until a suitable thermoset facesheet, gel point temperature, thermoplastic core, softening point temperature, and temperature determined at step 406 are found.

If at the temperature determined at step 406 the thermoplastic core and the thermoset facesheet is sufficiently soft/viscous/chemically reactive, then method 400 proceeds to step 410.

Step 410 comprises determining a curing profile (for, e.g., vacuum cure processing) to achieve chemical interaction and/or mechanical interlocking between the thermoset facesheet and the thermoplastic core. In certain embodiments, the thermoset facesheet and the thermoplastic core are co-cured together using the same curing profile. In certain embodiments, the chemical interaction and/or mechanical interlocking is sufficient to join or attach the thermoset facesheet and the thermoplastic core to one another. Chemical interactions, in some embodiments, may include chemical bonding, and/or mixing of one or more materials in the thermoset facesheet and thermoplastic core, for example, as described in the description of FIG. 3.

In particular embodiments, honeycomb core sandwich panels may be processed in a vacuum-capable oven, for example, when a suitable out-of-autoclave prepreg is used as a thermoset facesheet. The curing profile in vacuum cure processing, according to some embodiments, may comprise a particular temperature, dwell time, and vacuum or pressure settings to achieve sufficient chemical interaction and/or mechanical interlocking between the thermoset facesheet and the thermoplastic core. The curing profile, in some embodiments, is determined in step 410 such that thermoset facesheet chemical bonding with the thermoplastic core occurs concurrently with the thermoplastic core softening. For example, the temperature determined in step 406 may be used in the curing profile of step 408. Using this temperature in the curing profile (and, e.g., additional curing profile parameters) may cause the thermoplastic core to soften while at the same time cause the thermoset facesheet to cure and/or chemically interact with the thermoplastic core, and/or cause the thermoplastic core or facesheet to physically deform and mechanically interlock with each other. Some embodiments of vacuum curing used in step 410 may comprise a dwell time that describes the amount of time that a certain vacuum is applied, a certain temperature is applied, or both. Some embodiments of vacuum curing used in step 410 may also comprise first applying a vacuum and then raising the temperature to the temperature determined at step 406, which could also include maintaining that temperature for a period of time. Some embodiments of vacuum curing used in step 410 may comprise raising the temperature to the temperature determined at step 406 and then applying a vacuum for a certain time (e.g., the dwell time). More than one temperature may or may not be used in a curing profile, including temperatures below the softening point temperature and above the gel point temperature. Other embodiments of vacuum curing are also contemplated. While step 410 describes vacuum cure processing as an example curing process, other curing processes and suitable curing profiles are contemplated.

Step 412 comprises curing the thermoset facesheet and/or the thermoplastic core according to the cure profile. This step may include placing the thermoset facesheet in contact with the thermoplastic honeycomb core and curing the thermoset facesheet and/or the thermoplastic honeycomb core according to the curing profile determined in step 410. In some embodiments, only a single curing session and/or single curing profile is required to attach the honeycomb core to the facesheet (e.g., multiple curing sessions or profiles may not be required). As an example of step 412, a thermoset facesheet may be attached to a thermoplastic honeycomb core by using a curing profile containing a temperature that is (1) lower than the gel point temperature of the thermoset facesheet and (2) higher than the softening point temperature of the thermoplastic core. In such examples, the curing profile may begin at the temperature (used in the curing profile), begin at a lower temperature and rise to the temperature, and/or rise to a higher temperature than the temperature. In certain embodiments the temperature (used in the curing profile) may be held for 10%, 20%, 50%, 75%, 100%, or any other suitable percentage for time during the implementation of the curing profile.

The steps of method 400 may include multiple thermoset facesheets (comprising the same or different materials, e.g., an epoxy resin) and/or multiple thermoplastic cores. For example, method 400 may be modified or used to attach or join two thermoset prepreg facesheets (e.g., facesheets 104 and 106) to a single thermoplastic core (e.g., honeycomb core 102 comprising thermoplastic).

Although this disclosure describes and illustrates particular steps of the method of FIG. 4 as occurring in a particular order, this disclosure contemplates any steps of the method of FIG. 4 occurring in any order. An embodiment can repeat or omit one or more steps of the method of FIG. 4. Moreover, although this disclosure describes and illustrates particular components, analytical methods, and manufacturing procedures carrying out particular steps of the method of FIG. 4, this disclosure contemplates any combination of any components, analytical methods, and manufacturing procedures carrying out any steps of method 400.

FIG. 5 illustrates an example analysis of rheology characteristics of an example thermoplastic core (e.g., thermoplastic core 102) and an example thermoset facesheet (e.g., facesheet 104 or 106 comprising a thermoset material), according to an example embodiment. Specifically, graph 500 in FIG. 5 represents rheological characteristics of a thermoplastic core and an epoxy (an example thermoset) prepreg facesheet as a function of temperature. Graph 500 may, in certain embodiments, represent example analyses performed at steps 402-408 of method 400.

Line 502 (labeled "G'—Thermoplastic Core") represents the storage modulus, also known as the elastic modulus, of an example thermoplastic core. The storage modulus, shown as a function of temperature, is the ratio of the elastic stress to strain, which represents the ability of the thermoplastic core to store elastic energy. In this example, the softening point temperature 504 of the thermoplastic core can be determined by locating a temperature where the storage modulus of the thermoplastic core begins to drop more significantly with temperature. In graph 500, a softening point temperature 504 is located at about 292° F.

Line 506 (labeled "G'—Thermoset) represents the storage modulus, also known as the elastic modulus, of the thermoset in a thermoset facesheet, e.g., an epoxy prepreg, as a function of temperature. Line 508 (labeled "G"—Thermoset") represents the loss modulus, also known as the viscous modulus of the thermoset in the thermoset facesheet. The loss modulus, shown as a function of temperature, is the ratio of the viscous stress to strain, which represents the ability of the thermoset facesheet to dissipate energy. In this example, a gel point temperature 510 of the thermoset facesheet can be determined by locating a temperature where lines 506 and 508 cross. Therefore, in graph 500, the example thermoset facesheet being analyzed has a gel point temperature 510 of about 328° F.

Line 512 (labeled "η—Thermoset") represents the viscosity of the thermosetting resin in the example thermoset facesheet as a function of temperature. Line 512 shows that the thermosetting resin has a lower viscosity (e.g., flows to an extent) at temperatures between about 150° F. and 325° F. As the temperature of the thermosetting resin in the thermoset facesheet increases to and past gel point temperature 510, the thermosetting resin starts to solidify or cure relatively quickly (viscosity rises sharply with temperature).

In certain embodiments, a suitable temperature range 514 may be located between softening point temperature 504 and gel point temperature 510. This is an example of the temperature range analyzed in step 406 of method 400. A suitable temperature or temperatures for a curing profile in accordance with certain embodiments of this disclosure may exist within suitable temperature range 514. In particular embodiments a suitable temperature may be found at or around a point where lines 506, 508, and/or 512 begin to rise, which in the example graph 500 of FIG. 5 occurs at or around (or slightly beyond) 320-330° F. While FIG. 5 shows one example of certain rheological characteristics over a certain temperature range, various thermoplastic cores and thermoset facesheets may have many different types of rheological characteristics charted over many different temperature ranges.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

What is claimed is:

1. A method for manufacturing a honeycomb core sandwich panel, comprising:
    placing a thermoset facesheet in contact with a thermoplastic honeycomb core without using a separate adhesive disposed between the thermoset facesheet and the thermoplastic honeycomb core; and
    attaching the thermoset facesheet to the thermoplastic honeycomb core by using a curing profile comprising a temperature that is:
    lower than a gel point temperature of the thermoset facesheet;
    higher than a softening point temperature of the thermoplastic honeycomb core;
    analyzing the thermoset facesheet to determine the gel point temperature of the thermoset facesheet;
    analyzing the thermoplastic honeycomb core to determine the softening point temperature of the thermoplastic honeycomb core;
    determining whether the thermoplastic honeycomb core and the thermoset facesheet each have a viscosity at the temperature suitable for mechanical interlocking of the thermoplastic honeycomb core and the thermoset facesheet;
    determining the curing profile comprising the temperature; and
    wherein using the curing profile comprises curing the thermoplastic facesheet and the thermoplastic honeycomb core at the same time and at the same temperature.

2. The method of claim 1, wherein the thermoset facesheet comprises an epoxy resin.

3. The method of claim 1, wherein the thermoplastic honeycomb core comprises polyetherimide (PEI).

4. The method of claim 1, wherein:
the thermoset facesheet comprises an epoxy resin prepreg; and
the thermoplastic honeycomb core comprises polyetherimide (PEI).

5. The method of claim 1, wherein the thermoplastic honeycomb core comprises a plurality of cells, each cell comprising a curved cell wall in a substantially circular tube shape, wherein:
measured at a midplane of each cell, the diameter of the substantially circular tube does not vary more than about 10 percent within the same cell.

6. The method of claim 1, wherein, during curing:
the thermoset facesheet chemically interacts with the thermoplastic honeycomb core;
the thermoplastic honeycomb core deforms at a plurality of locations where the thermoplastic honeycomb core is in contact with the thermoset facesheet; and
the thermoset facesheet mechanically interlocks with the thermoplastic honeycomb core.

7. The method of claim 1, wherein the curing occurs:
at a pressure less than ambient pressure for a certain period of time; and
in a vacuum-capable oven.

8. A method for manufacturing a honeycomb core sandwich panel, comprising:
placing a thermoset facesheet in contact with a thermoplastic honeycomb core; and
attaching the thermoset facesheet to the thermoplastic honeycomb core by using a curing profile comprising a temperature that is:
lower than a gel point temperature of the thermoset facesheet;
higher than a softening point temperature of the thermoplastic honeycomb core;
analyzing the thermoset facesheet to determine the gel point temperature of the thermoset facesheet;
analyzing the thermoplastic honeycomb core to determine the softening point temperature of the thermoplastic honeycomb core;
determining whether the thermoplastic honeycomb core and the thermoset facesheet each have a viscosity at the temperature suitable for mechanical interlocking of the thermoplastic honeycomb core and the thermoset facesheet;
determining the curing profile comprising the temperature; and
wherein using the curing profile comprises curing the thermoplastic facesheet and the thermoplastic honeycomb core at the same time and at the same temperature.

9. The method of claim 8, wherein:
the thermoset facesheet comprises an epoxy resin; and
the thermoplastic honeycomb core comprises polyetherimide (PEI).

10. The method of claim 8, wherein:
the thermoset facesheet comprises an epoxy resin prepreg; and
the thermoplastic honeycomb core comprises polyetherimide (PEI).

11. The method of claim 8, wherein the thermoplastic honeycomb core comprises a plurality of cells, each cell comprising a curved cell wall in a substantially circular tube shape, wherein:
measured at a midplane of each cell, the diameter of the substantially circular tube does not vary more than about 10 percent within the same cell.

12. The method of claim 8, wherein, during curing:
the thermoset facesheet chemically interacts with the thermoplastic honeycomb core;
the thermoplastic honeycomb core deforms at a plurality of locations where the thermoplastic honeycomb core is in contact with the thermoset facesheet; and
the thermoset facesheet mechanically interlocks with the thermoplastic honeycomb core.

13. The method of claim 8, wherein the curing occurs:
at a pressure less than ambient pressure for a certain period of time; and
in a vacuum-capable oven.

\* \* \* \* \*